United States Patent Office 3,349,740
Patented Oct. 31, 1967

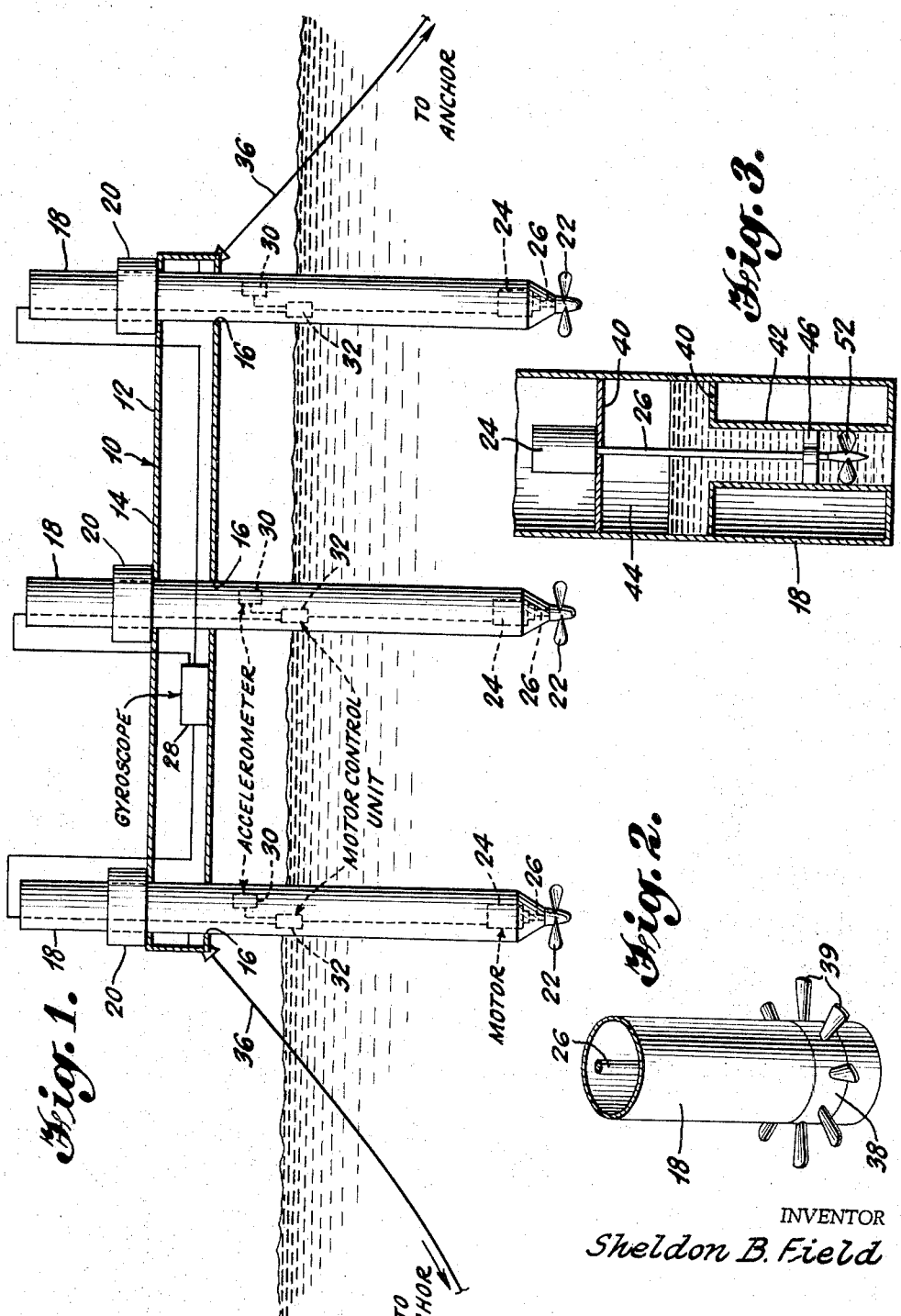

3,349,740
FLOATING PLATFORM
Sheldon B. Field, Floral Park, N.Y., assignor to John J. McMullen Associates Incorporated, New York, N.Y., a corporation of New York
Original application Feb. 1, 1965, Ser. No. 429,473, now Patent No. 3,318,275, dated May 9, 1967. Divided and this application Oct. 31, 1966, Ser. No. 607,090
1 Claim. (Cl. 114—.5)

ABSTRACT OF THE DISCLOSURE

A floating marine platform having a plurality of vertical hollow columns of sufficient size to displace amounts of water necessary to buoyantly support the platform and all the equipment thereon above the free surface of the ambient. The interior of each column normally below the water surface defines a tank which communicates with the ambient through a port. Rotating blades are mounted near the port and driven by a motor in order to drive liquid into and out of the tank so as to increase and decrease the buoyancy of the column. In order to stabilize the platform in roll, pitch and heave, sensing means are provided including a gyroscope located on the platform and an accelerometer within each column. A motor control unit in each column receives the output from the gyroscope and accelerometer and feeds controlling signals to the motor for driving liquid into or out of the respective tank.

---

This is a division of application Ser. No. 429,473, filed Feb. 1, 1965, now Patent No. 3,318,275.

The present invention relates to floating platforms and more particularly to a unique stabilization system for floating platforms and the like.

With increased activity in offshore drilling operations throughout the world, there is now a demand for development of large, heavy duty platforms which are capable of housing and supporting personnel, equipment and the like. The conventional platforms having the platform plane resting at the stop surface of the body of water are undesirable for drilling operations because the surface action of the water imparts violent pitching, rolling and heaving movements thereto. Therefore, it is preferred that these platforms be somehow located above the top surface of the water so that wave action will not affect the stability of the platform to any great extent.

One way of supporting the platform above the free surface of the body of water is to run supporting columns or supports from the bottom surface of the body of water up to the supported platform. However, this manner of support meets with many engineering difficulties and much expense.

Another manner of supporting the platform above the free surface is to mount the platform with drums or columns of great dimension having hollow centers and extending downwardly into the body of water. The hollow columns afford the necessary buoyancy or upward force, and, if enough columns are arranged about the platform, the entire system floats with the platform raised above the free surface of the water. Normally, hydraulic jacks are provided to raise and lower the plane of the platform with respect to the free surface of the water. For most marine operations, such as offshore drilling, it is necessary to secure anchors into the ocean floor and, by the use of cables connected between the floating platform and the respective anchors, maintain the platform in a stationary position with respect to the ocean floor.

However, these types of floating platforms, although they support the plane of the platform above the free surface of the water, are unstable and will experience unwanted degrees of roll, pitch and heave due to wave action and movement of the free surface of the water. For offshore drilling, plaform heave is the most critical motion.

It is a primary purpose of the present invention to provide an active stabilization system for the aforementioned types of floating platforms.

Other and further objects of the present invention will become apparent with the following detailed description when taken in view of the drawings in which:

FIG. 1 illustrates a vertical sectional view of the novel platform illustrating one embodiment of the present invention;

FIG. 2 is a cutaway of a platform column illustrating another embodiment of the present invention; and FIG. 3 is a vertical section of a platform column illustrating another embodiment of the present invention.

Stated briefly, the platform has a predetermined number of vertically disposed hollow columns or cylinders of great dimension extending well below the free surface of the body of water. The collective buoyancy or upward force afforded by these columns or cylinders is sufficient to raise the platform above the free surface of the water, since the magnitude of the water displaced by the columns alone is equal to the weight of the entire floating platform, including the platform, equipment, personnel and columns. A suitable number of conventional anchors are embedded in the ocean floor, and high tensile cables are attached to said anchors and said floating platform for maintaining the platform in a stationary position with respect to the ocean floor.

Each column has mounted near the bottom thereof a propeller which is motor controlled for applying an upward or downward thrust to its associated column by rotating and being in contact with the liquid medium. In one embodiment of the present invention, the propeller acts to draw quantities of liquid within a hollow tank disposed within the column for the purpose of supplementing the developed thrust by increasing or decreasing the buoyancy of that respective column. A motor located at the bottom of each column is controlled by a motor control unit which receives signals from an accelerometer and gyroscope in a manner to be further described hereinbelow.

Referring now to the figures where like references designate like structure, there is illustrated a floating platform generally indicated as 10 having a platform section 12 with an upper surface 14 upon which equipment, personnel and the like (not shown) are supported. Platform 12 defines a series of holes 16 which receive vertically disposed columns 18 extending above and below the plane of platform 12. Columns 18 are of great dimension and have hollow interiors for the purpose of displacing large volumes of water below the free surface of the body of water. Conventional jack means 20 are secured to platform 12 and engage the columns 18 in a conventional manner and function to raise or lower the plane of platform 12 with respect to columns 18. Simultaneous operation of all jacks 20 is preferred.

The hydraulic jacks 20 are conventional, and, therefore, a detailed disclosure thereof is not considered necessary. It is to be understood that the number and location of columns 18 on platform 12 are not limited by the present invention.

Hydraulically designed propellers 22 are rotatably mounted at the bottom of columns 18 and are designed to cause upward or downward movement of the medium depending upon the direction of rotation thereof. As an alternate arrangement, propellers can be of the variable pitch type to render the positive and negative thrust notwithstanding only one direction of rotation. Electric motors 24 drive propellers 22 by rotation of drive shaft 26. The direction of rotation, speed, and duration of rotation of propeller 22 are controlled by a gyroscope-accelerometer combination feeding a motor control unit in the following manner. Gyroscope means 28 or other stable vertical is preferably located in the geometrical center of platform 12 and is adapted to sense pitch, roll and yaw in the known manner. Each column 18 has an accelerometer 30 supported therein, and each accelerometer 30 is adapted to sense the direction and magnitude of the vertical acceleration of its associated column 18.

The gyroscope means 28 feeds an electric signal to each motor control unit 32 located in each column 18, and the value thereof is representative of the instantaneous pitch, roll and yaw motion of the respective receiving column 18 with respect to the remaining structure of the platform. At the same time, each accelerometer 30 feeds an electric signal to its associated motor control unit which is representative of the positive or negative instantaneous acceleration experienced by that column. The motor control unit receives these electric signals and feeds a control signal to the motor 24, thus energizing motor 24 in the forward or reverse directions or not energizing motor 24 if a zero signal is fed.

The basic gyroscope-accelerometer combination, together with the motor control unit and drive motor, constitutes a conventional and even commercially available control system and is well known to those skilled in the art, and, therefore, for the sake of brevity, an elaborate disscusion of this known arrangement has been omitted.

With variable pitch propellers, the motor control unit would be replaced by a propeller pitch control servo (also well known to those skilled in the art) which feeds appropriate hydraulic signals to pistons which, in turn, control gearing in the propeller hub. Since variable pitch control is well known in the marine art, a detailed description thereof has been omitted.

The operation of the floating platform forming the present invention will now be described. After equipment, personnel and the like are assembled on the top surface 14 of platform 12, hydraulic jacks 20 are actuated, thus raising platform 12 above the free surface of the body of water. If the platform experiences pitch, yaw, roll or heave, the appropriate signals are fed from the sensors (gyroscope 28 and accelerometers 30) to the respective motor control units 32 located at each vertical column 18. The respective motors 24 drive via shafts 26 the propellers 22 in the predetermined direction, forward or reverse, which propellers 22 impart an additional upward or downward force to the respective columns 18, thus stabilizing the plane of platform 12. Anchor cables 36 maintain platform 12 in a stationary position with respect to the ocean floor, and the stabilization system maintains the plane of platform 12 in a preferable horizontal position.

Referring now to FIG. 2, there is illustrated yet another embodiment of the present invention, whereby the propeller blades 39 are rigidly mounted and project outwardly from a rotating collar 38. Drive shaft 26 thus rotates collar 38 to enable the rotating blades to impart an upward or downward thrust to column 18.

In FIG. 3, a third embodiment of the present invention is illustrated wherein walls 40 in cooperation with a portion of column 18 define a tank 44, and a vertically disposed hollow shaft 42 is mounted in the center of column 18 and communicates on one end with tank 44 and at the other end with the ambient. Propeller 52 has an outer dimension the same as shaft 42 and has a center of rotation coinciding with the axis of the shaft 42. A bearing mount 46 is mounted in shaft 42 and rotatably supports shaft 26 connected to propeller 52 and driven by motor 24.

When stabilization of the platform is to begin, propeller 52 is rotated, driving liquid from tank 44 until the level of liquid within tank 44 reaches a predetermined average operating level. Thereafter, the rotation of propeller 52 is controlled by motor 24 which receives its signals from the motor control unit in the manner as set forth above. The rotation of the propeller 52 drives liquid into tank 44 or removes liquid from the tank, thus adding to or subtracting from the buoyancy of the associated column 18 in sequence with the pitch, roll and heave motion of the entire floating platform.

Although there are three embodiments shown in the figures, usually only one embodiment would be used on all columns of a single floating platform. However, use of multiple embodiments is not be precluded.

Therefore, it can be seen that the present invention will stabilize floating platforms not only against roll and pitch motion but also provides forces which counteract heave.

Although reference is made throughout the present description to a drilling platform, it is to be understood that this reference is only by way of example and that the present invention can be used to stabilize any type of floating platform. It is also to be understood that other and further modifications of the present invention can be made without departing from the spirit thereof.

What is claimed is:

A marine platform assembly for use in a body of water comprising a horizontally disposed platform, a plurality of vertically disposed hollow columns mounted to said platform and extending downward therefrom into the body of water, said columns being adapted to displace sufficient amounts of water as to displace said platform above the free surface of the water, each of said columns comprising inner walls defining a tank within the outer dimensions of said column, said tank being partially filled with water, a port disposed between said tank and the ambient to enable movement of water therebetween, blades rotatably mounted in each said port so that rotation of said blades drives water into and out of said tank to add to and decrease from the overall buoyancy of that respective column, means connected to said blades to rotate same, and sensing means comprising a gyroscope, and wherein said sensing means further comprises an accelerometer mounted in each column, and a control unit mounted in each column connected to the outputs of said accelerometer and gyroscope and being responsive to all motions of the platform assembly in space for controlling the time of actuation of and the direction of force imparted to said blades so that the platform is stabilized for roll, pitch and heave.

References Cited

UNITED STATES PATENTS 3,273,526  9/1966  Glosten _____ 114—0.5
3,285,213  11/1966  Whittle _____ 114—0.5

MILTON BUCHLER, *Primary Examiner.*

T. M. BLIX, *Assistant Examiner.*